# 2,970,891

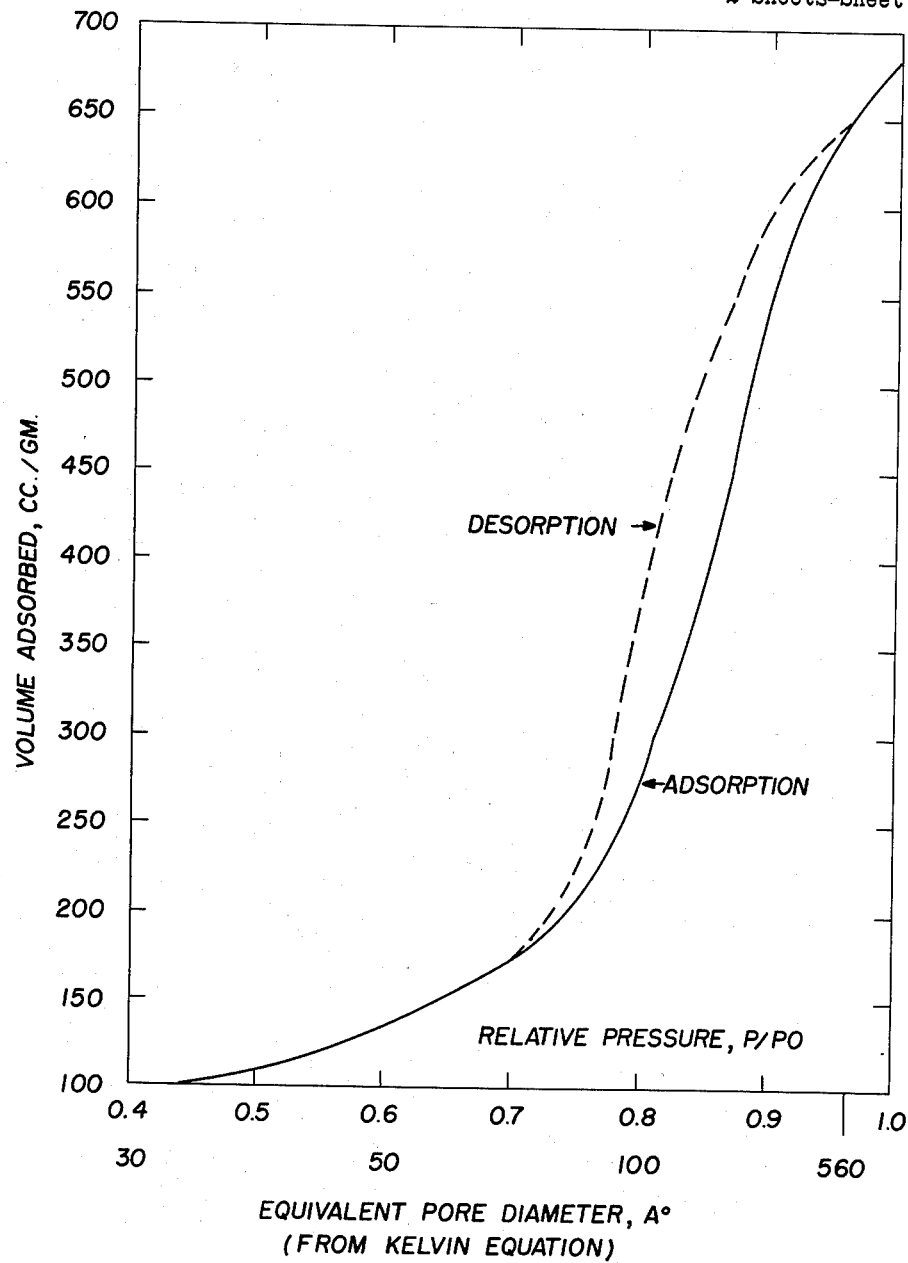
FIGURE-I

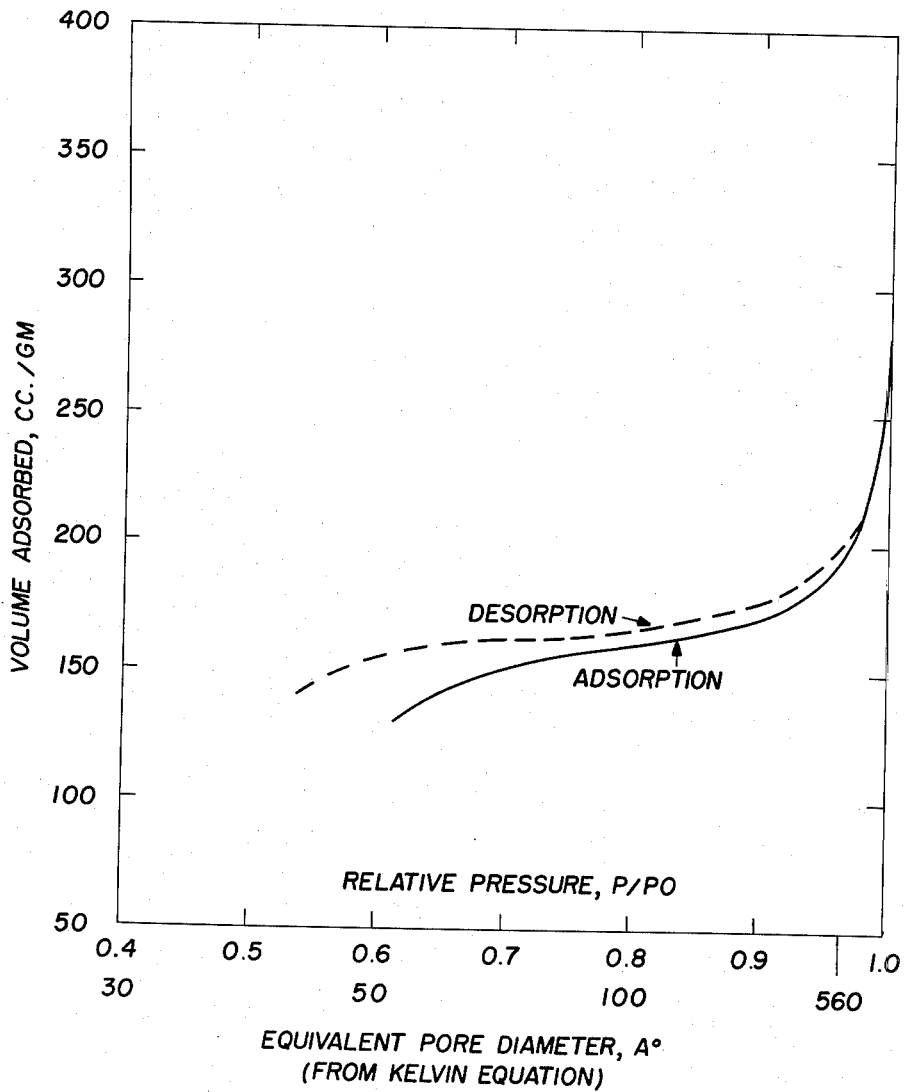

PREPARATION OF ALUMINA

John A. Hinlicky, Irvington, N.J., assignor to Esso Research and Engineering Company, a corporation of Delaware Filed Mar. 29, 1957, Ser. No. 649,541

16 Claims. (Cl. 23—143)

This invention relates to the preparation of improved solid catalysts for the conversion of hydrocarbon materials. More particularly, it relates to the preparation of high surface area alumina having large pores and a large pore volume prepared by the low temperature hydrolysis of aluminum alcoholate in the presence of $CO_2$ and ammonium hydroxide. The alumina of this application is an exceedingly effective support material for hydroforming catalysts containing p atinum, molybdenum oxide or cobalt molybdate as the active catalytic component. Excellent catalysts of high activity, good selectivity and stability are thus produced.

Hydroforming processes are well known at this time and the basic operation of the hydroformer is no part of this invention, e.g., see Petroleum Processing, August 1955, pages 1170 through 1196.

Usually the normally liquid feed stock boils substantially within the range of from about 150° to 430° F. and more particularly 200° to 350° F. The light ends, i.e., the material boiling from about 0° to 200° F., are not ordinarily subjected to this reaction, for the reason that the virgin naphtha light ends are not appreciably upgraded by conventional reforming treatments. The feed or charging stock to the hydroforming reactor can be a virgin naphtha, a cracked naphtha, a coker naphtha, a Fischer-Tropsch naphtha, a mixture of these, or the like.

Hydroforming operations are ordinari'y carried out in the presence of hydrogen or hydrogen-rich recycle gas at temperatures of 750° to 1150° F. in a pressure range of about 50 to 1000 pounds per square inch, and in contact with solid catalysts of the types mentioned above.

The chemical reactions involved in the hydroforming process include dehydrogenation of naphthenes to the corresponding aromatics, isomerization of straight chain paraffins to form branched chain paraffins, isomerization of cyclic compounds such as ethylcyclopentane to form methylcyclohexane, and some aromatization, dealkylation and hydrocracking of paraffins. In a hydroforming operation which is conducted efficiently it is possible with the use of a proper catalyst and proper conditions of operation to hydroform a virgin naphtha to a hydroformate having research clear octane number of from 95 to 98 and obtain yields of $C_5+$ hydrocarbons as high as 85%.

Catalysts used in hydroforming are platinum, palladium, molybdenum oxide, chromium oxide, cobalt molybdate or in general oxides or sulfides of metals of groups IV-VIII of the periodic system of elements or mixtures of these elements supported or dispersed upon a base or spacing element such as alumina gel, precipitated alumina, or zinc aluminate spinel.

Particularly useful catalysts for hydroforming operations are:

(1) .001–2.0 weight percent platinum upon an alumina spacing agent or base, (2) 5–20 weight percent molybdenum oxide upon an alumina spacing agent or base, and (3) 1–8 weight percent cobalt oxide, and 5 to 20% molybdenum oxide on an alumina spacing agent or base.

The new alumina of this application is advantageously used as the base in all of these catalysts, and can be excellently extruded for fixed bed use or prepared in a form suitable for fluid bed use.

In addition it is useful also as a drying agent and in the field of gas treating because of its high adsorptive capacity.

It is known that hydroforming catalysts are better the higher the surface area, the larger the pores, and the larger the pore volume of the alumina base used.

It has now been found that a catalyst base having higher surface area, larger pores, and larger pore volume may be prepared by hydrolyzing an aluminum-alcoholate in contact with an aqueous medium containing ammonium hydroxide and carbon dioxide and having a pH of above about 7. Aluminum alcoholate is prepared in the conventional manner by reacting aluminum metal with a high boiling, partially miscible alcohol such as amyl alcohol using mercuric chloride as a catalyst. Alcohols having fewer or more carbon atoms may be used but it is preferred that $C_5$ alcohols are used. Preferably the hydrolysis of the aluminum alcoholate is carried out at a temperature below about 40° F. with concentrated ammonium hydroxide in the presence of $CO_2$ supplied in the form of Dry Ice. Alternatively, another preferred method of supplying the $CO_2$ during the hydrolysis of the aluminum alcoholate is by jetting the $CO_2$ into the alcoholate water mixture from high pressure. Applicant also prefers to use Dry Ice to lower the temperature of the ammonium hydroxide before it is mixed with the alcoholate. The presence of the $CO_2$ has been found to be critical and an entirely different and much poorer alumina has been found to result when similar conditions minus the $CO_2$ are employed during hydrolysis. After hydrolysis the slurry is aged for about ½ hour to 10 days, and is then steam stripped or stripped by heating preferably with inert gas and agitation. It is then dried and calcined at about 400° F.–1500° F. preferably 1000° F.–1200° F. for about 2–6 hours. An activated alumina having a pore volume of about 0.90–1.20 cc./g. and an average pore diameter of from about 135–180 A. suitable as a catalyst support results.

In the following table two commercial alumina bases are compared with an alumina produced by the present process.

| Sample | Alumina Type | Surface Area, m.²/gm. | Pore Vol., cc./gm. | Pore Dia., A. |
|---|---|---|---|---|
| (x) Commercial alumina | Eta | 210 | 0.27 | 52 |
| (y) Commercial alumina | Gamma | 250 | 0.50 | 80 |
| Al Alcoholate Hydrolyzed in $NH_4OH+CO_2$ | Gamma | 263 | 1.04 | 158 |

The above values are calculated by the well known modified Brunauer, Emmett, Teller method outlined in an article in Journal of the American Chemical Society, vol. 70 at page 1405, entitled "The Determination of Pore Size Distribution From Gas Adsorption Data," by C. G. Shull.

It is noted that the present alumina has a somewhat higher surface area and a much higher pore volume and pore diameter than the other two aluminas in the table. Additionally it can be seen from attached Figures 1 and 2 presenting the complete nitrogen adsorption isotherm for the present alumina and for 100% eta alumina (for comparison) that a striking difference is apparent. This is due to the great preponderance of large pores in the former, very few pores being below 60 A. in diameter.

Commercial gamma aluminas give isotherms similar to the one shown for eta alumina.

In order to set forth the invention more fully and to provide a disclosure of the preferred embodiments thereof, there is set forth below a specific example giving full details as to the manner in which the new catalyst may be prepared. It is to be understood that the details appearing in this specific example are illustrative and do not impose any restriction on the invention.

*Example I*

Aluminum alcoholate was prepared in the conventional manner by reacting high purity aluminum metal with a high boiling partially water miscible alcohol such as amyl alcohol in the presence of a solvent which is a petroleum fraction boiling in the range of 200–400° F., using mercuric chloride as a catalyst. Alcohols having fewer or more carbon atoms could have been employed but it was preferred to use amyl alcohol. Eight liters commercial concentrated ammonium hydroxide solution (28% $NH_3$) were contacted with $CO_2$ (by adding Dry Ice). There was a vigorous evolution of white finely divided solid material which appeared to be $(NH_4)_2CO_3$ as the temperature dropped to about 35° F. and the addition of Dry Ice was continued until the evolution of this fine white material abated at a temperature of about 20° F. Four liters of aluminum amylate-solvent solution prepared as described above was then added to this prepared ammonium hydroxide solution as a spray using an air jet. Also, while the aluminum alcoholate was being added, the mixture was seeded with small particles of Dry Ice. At completion of the addition of the aluminum alcoholate the final temperature of the solution was 25° F. The precipitated alumina was then allowed to age at ambient conditions for 10 days after which the alumina was stripped for about 1 hour by heating while passing a stream of nitrogen through the slurry. It was then dried at 250° F., and at this point X-ray examination of the alumina indicated that it was alpha alumina monohydrate. Finally the dried alumina was calcined 4 hours at 1100° F. The alumina base was then ready for incorporation of the active catalyst material e.g. impregnation with platinum.

An attempt was made to isolate the factors responsible for the formation of this large pore alumina. It was found that when the preparation was conducted as above described, minus only the addition of $CO_2$ (temperatures of 32° F. and 25° F. were tried) an alumina no better than the commercial eta alumina base previously mentioned was obtained. This is shown in the following table:

| Alumina Preparation | Surface Area, m.²/gm. | Pore Vol., cc./gm. | Pore Dia., A. |
|---|---|---|---|
| (x) Commercial Alumina | 210 | 0.27 | 52 |
| 32° F. $NH_4OH$ Hydrolysis | 185 | 0.25 | 54 |
| −25° F. $NH_4OH$ Hydrolysis | 196 | 0.27 | 54 |

In addition the nitrogen adsorption isotherms indicated no large pore hysteresis for the aluminas made in the absence of $CO_2$.

From the data mentioned it can be postulated that the large pores in the present alumina are due to the carbon dioxide and/or the method of chilling. The addition of the Dry Ice probably formed many small nuclei of $(NH_4)_2CO_3$ which served as sites for alumina crystal growth. This $(NH_4)_2CO_3$ was then probably later decomposed to $NH_3$ and $CO_2$ leaving holes in the alumina crystal network. Rapid heating of the alumina slurry according to this theory would probably promote the formation of the large pores. This explanation is only suggestive and applicants do not limit themselves in this invention to any particular theory accounting for the advantages attained.

The hard mechanically strong gamma alumina prepared by the method described above was tested by compositing it with platinum to form a platinum hydroforming catalyst and then testing such catalyst in service. The preparation was as follows:

314 grams of the present alumina, calcined for 4 hours at 1100° F. were impregnated with 4.7 grams of chloroplatinic acid dissolved in 204 mls. of water. The mixture was well homogenized and allowed to set at room temperature over night. This was followed by drying at 250° F. in an oven. The sample was then screened through a 20 mesh screen and pilled. The pills were then calcined 1 hour at 1100° F.

The catalyst so prepared was found to have an activity about 25% greater (94.7 RON clear vs. 92.3 RON clear) than that of an equivalent conventional gamma alumina-supported platinum catalyst, and about 10% less than that of a conventional eta alumina base catalyst (94.7 RON clear vs. 96 RON clear). These results indicate a definite commercial advantage for this catalyst. Its larger pore structure and higher surface area make the catalyst more amenable to chlorine treating than eta alumina. Additionally, the base is hard and mechanically strong, is suitable for fluid use, and may for fixed bed use be extruded more easily than eta alumina. The last is an important factor in the economical preparation of catalysts for fixed bed service. Therefore, although the initial activity of the gamma alumina prepared by this process is 10% less than that of eta alumina the other factors more than outweigh this disadvantage.

The foregoing description contains a limited number of embodiments of the present invention. It will be understood that this invention is not limited thereto, since numerous variations are possible without departing from the scope thereof.

What is claimed is:

1. The method of preparing a high surface area alumina having large diameter pores and large pore volume and which is especially adapted to be used as a catalyst support which comprises the steps of hydrolyzing an aluminum alcoholate in contact with an aqueous medium containing ammonium hydroxide and carbon dioxide and having a pH of above about 7, aging the resultant hydrous alumina slurry, stripping the slurry, drying the said slurry and calcining the dried alumina at a temperature in the range of about 400° F.–1500° F. to effect activation thereof.

2. The method of preparing a high surface area alumina having large diameter pores and large pore volume and which is especially adapted to be used as a catalyst support which comprises the steps of hydrolyzing an aluminum alcoholate at below about 40° F. in contact with an aqueous medium containing ammonium hydroxide and carbon dioxide and having a pH of above about 7, aging the resultant hydrous alumina slurry, stripping the slurry, drying the said slurry and calcining the dried alumina at a temperature in the range of about 400° F.–1500° F. to effect activation thereof.

3. The method of preparing a high surface area alumina having large diameter pores and large pore volume and which is especially adapted to be used as a catalyst support which comprises the steps of hydrolyzing an aluminum alcoholate at below about 40° F. in contact with an aqueous medium containing ammonium hydroxide and carbon dioxide supplied in the form of Dry Ice, said aqueous medium having a pH of above about 7, aging the resultant hydrous alumina slurry, stripping the slurry, drying the said slurry and calcining the dried alumina at a temperature in the range of about 400° F.–1500° F. to effect activation thereof.

4. The method of preparing a high surface area alumina having large diameter pores and large pore volume and which is especially adapted to be used as a catalyst support which comprises the steps of hydrolyzing an aluminum alcoholate at below about 40° F. in contact with an aqueous medium containing ammonium hydroxide and carbon dioxide which is jetted into the liquid from high pressure, said aqueous medium having a pH of above about 7, aging the resultant hydrous alumina slurry, stripping the slurry, drying the said slurry and calcining the dried alumina at a temperature in the range of about 400° F.–1500° F. to effect activation thereof.

5. The method of preparing a high surface area alumina having large diameter pores and large pore volume and which is especially adapted to be used as a catalyst support which comprises the steps of contacting an ammonium hydroxide solution having a pH of above 7 which has been cooled to below about 40° F. with $CO_2$, maintaining the temperature at below 40° F. and continuing to add $CO_2$ while aluminum alcoholate is added with agitation, aging the resultant hydrous alumina slurry, stripping the slurry, drying the said slurry and calcining the dry alumina at a temperature in the range of about 400° F.–1500° F.

6. The method of claim 5 in which the $CO_2$ is added in the form of Dry Ice.

7. The method of claim 5 in which the $CO_2$ is added by jetting it from high pressure into the solution.

8. The method of preparing a high surface area alumina having large diameter pores and large pore volume and which is especially adapted to be used as a catalyst support which comprises the steps of contacting a concentrated ammonium hydroxide solution having a pH of about 9–10.5 which has been cooled to below about 40° F. with $CO_2$, maintaining the temperature at below 40° F. and continuing to add $CO_2$ while an aluminum alcoholate is added with agitation, aging the resultant hydrous alumina slurry, stripping the slurry, drying the said slurry and calcining the dried alumina at a temperature in the range of about 400° F.–1500° F. to effect activation thereof.

9. The method of claim 8 in which the $CO_2$ is added in the form of Dry Ice.

10. The method of claim 9 in which the cooling of the ammonium hydroxide is effected by the addition of Dry Ice and in which Dry Ice is added as a seed material during the addition of the aluminum alcoholate to the concentrated ammonium hydroxide solution.

11. The method of claim 9 in which the addition of the alcoholate to the ammonium hydroxide solution takes place at a temperature of about 25° F.

12. The method of claim 9 in which the aging step is conducted for a period of about ½ hour to 10 days.

13. The method of claim 8 in which the $CO_2$ is added by jetting it from a high pressure into the solution.

14. The method of claim 13 in which the addition of the alcoholate to the ammonium hydroxide solution takes place at a temperature of about 25° F.

15. The method of claim 13 in which the aging step is conducted for a period of about ½ hour to 10 days.

16. The method of preparing a high surface area alumina having large pore diameters, large pore volume and adapted for use as a catalyst support, which comprises the steps of hydrolyzing an aluminum alcoholate in contact with an aqueous medium containing ammonium hydroxide and carbon dioxide and having a pH above about 7, aging a slurry of precipitated alumina resulting from said hydrolyzing, and thereafter drying and heating said precipitated alumina at temperatures in the range of about 400° F. to 1500° F. for activating the alumina to make it have a pore volume of about 0.9 to 1.20 cubic centimeters per gram and an average pore diameter of about 135 to 180 A.

References Cited in the file of this patent

UNITED STATES PATENTS

| | | |
|---|---|---|
| 2,762,782 | Kimberlin et al. | Sept. 11, 1956 |
| 2,838,375 | Teter et al. | June 10, 1958 |
| 2,889,268 | Dinividdie et al. | June 2, 1959 |